Figure 1:
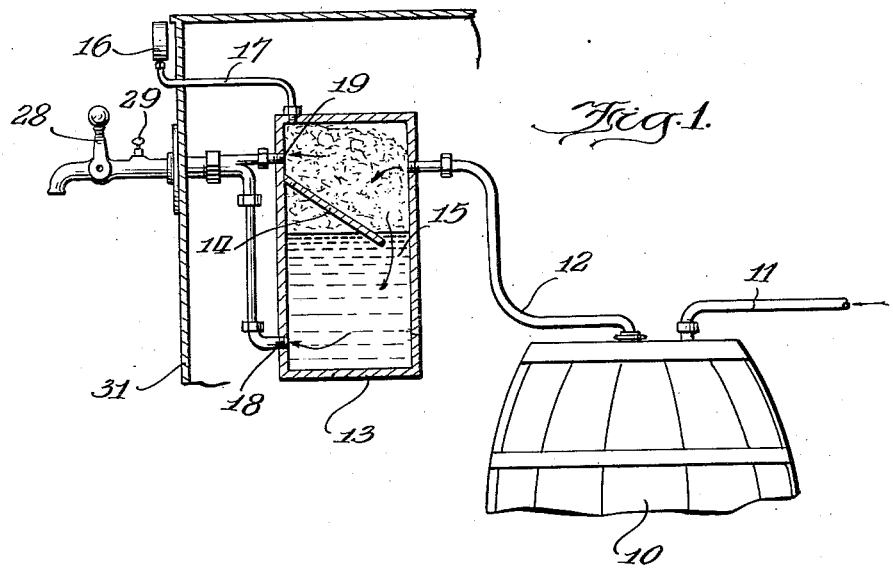

July 11, 1933.  A. GORDON  1,917,582

BEER SEPARATOR AND DISPENSING FAUCET

Filed March 27, 1933

Inventor:
Arthur Gordon
By
Atty.

Patented July 11, 1933

1,917,582

UNITED STATES PATENT OFFICE

ARTHUR GORDON, OF CHICAGO, ILLINOIS

BEER SEPARATOR AND DISPENSING FAUCET

Application filed March 27, 1933. Serial No. 662,914.

This invention relates to a novel and improved device for dispensing beer or similar beverages from bulk containers, and more particularly to a novel and improved separator and faucet through which the beverage may be dispensed.

In the dispensing faucets heretofore used for drawing beer or similar beverages from bulk containers there was no provision made for regulating the amount of foam or air which flowed through the faucet with the result that a great deal of the beverage was wasted until a glass or stein of the beverage was drawn with the desired amount of foam therein. In other words, the foam had to be scraped off and permitted to flow into the waste drain in order to properly fill the glass or stein, so that the proportion of foam to the beverage would be of the desired amount.

It is, therefore, the main object of this invention to provide a device through which a beverage, such as beer or the like, may be dispensed with means for separating the foam and air from the beverage proper and a faucet connected with said means permitting the regulation of the amount of foam that may be discharged with the beer at the dispensing end of the faucet.

Another object of this invention is to provide a novel and improved device for dispensing beer or the like from bulk containers, said device including a separator whereby the beverage proper may be separated from the foam and air and an improved faucet connected with said separator, said faucet being provided with a plurality of passages, one of which is connected with the lower portion of the separator for drawing a supply of the beverage proper and the other passage is connected with the upper portion of the separator for permitting the passage of a supply of foam to the discharge end of the faucet.

A further object of this invention is to provide a device of the character described for dispensing a beverage, such as beer or the like, from bulk containers, said device having means associated therewith for separating the beverage proper from the foam, and a faucet for dispensing both said beverage and foam connected with said first mentioned means, and adjustable means mounted in said faucet for regulating the flow of the foam to the discharge end of the faucet.

A still further object of this invention is to provide a novel and improved device for dispensing a beverage, such as beer or the like, from bulk containers, said device including means for separating the beverage proper from its foam, and means for discharging simultaneously both said beverage proper and foam and for regulating the amount of foam that is being discharged with the beverage.

A still further object of this invention is to provide a novel and improved device for dispensing a beverage, such as beer or the like, from bulk containers, said device including a separator whereby the beverage proper may be separated from its foam and air and a faucet having a plurality of passages therethrough connected with said separator whereby one of said passages will be connected with the lower portion of the separator for drawing off a supply of the beverage proper and the other passage being connected with the upper portion of the separator for drawing off a supply of foam, and means provided in said last mentioned passage for regulating the flow therethrough.

A still further object of this invention is to provide a novel and improved device for dispensing a beverage, such as beer or the like, under pressure, said device including a mechanism for separating the beverage proper from its foam and air, and novel means for drawing off simultaneously both said beverage and foam, said last mentioned means including means for regulating the flow of the foam.

A still further object of this invention is to provide a device of the character described which will be simple in construction, assembly and operation, which may be produced along lines convenient for low cost manufacture and installation, and which will be highly efficient for carrying out the purposes for which it is designed.

With the foregoing and other objects in view, which will appear as the description proceeds, the invention consists in the certain novel features of construction, arrangement and combination of parts hereinafter more fully described and illustrated in the accompanying drawing, and particularly pointed out in the appended claims, it being understood that various changes in form, proportion, size and minor details of the structure may be made without departing from the spirit or sacrificing any of the advantages of the invention.

For the purpose of facilitating an understanding of my invention, I have illustrated in the accompanying drawing an improved embodiment thereof, from an inspection of which, when considered in connection with the following description, my invention, its mode of construction, assembly and operation, and many of its advantages should be readily understood and appreciated.

Figure 2:
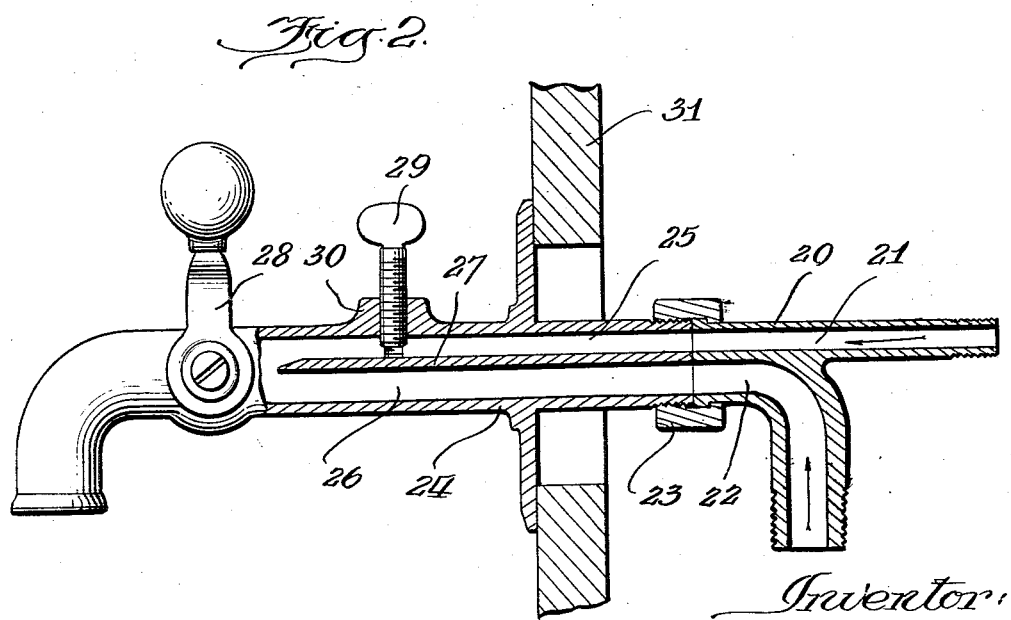

Referring to the drawing in which the same characters of reference are employed to indicate corresponding or similar parts throughout the several figures of the drawing:

Figure 1 is a diagrammatic view showing my improved dispensing mechanism, parts thereof being shown in section and parts in elevation; and Fig. 2 is a longitudinal sectional view through my improved dispensing faucet.

Referring to the drawing more specifically by characters of reference, the numeral 10 designates a bulk container, such as a barrel or the like, from which the beverage is to be dispensed. A conduit 11, one end of which is connected with a compressor (not shown) is connected to the upper end of the barrel 10 for supplying the desired air pressure to the upper portion of the barrel, by means of which the beverage may be forced therefrom.

A conduit 12 leads from the barrel 10 to the upper portion of a separator 13, which separator may be of any suitable size and shape and which is provided intermediate its ends with the separator plate 14, which plate extends across the full width of the separator tank 13 and is inclined as shown in the drawing, and having one end secured to one wall of the separator tank 13 and its other end spaced from the opposite wall of said separator tank to provide a space 15. The separator tank 13 will perform the function of separating the beverage proper from its foam and air, and as shown in Fig. 1, said beverage proper will flow to the bottom of the tank, whereas the foam and air will rise to the top thereof. A suitable air gauge 16 is connected by means of a pipe 17 with the upper portion of the separator tank 13. By means of this gauge, the operator may readily observe the pressure in the barrel 10.

Suitable outlets are provided for the separator tank 13, said outlets being provided adjacent the bottom portion of the tank, as shown at 18, and also adjacent the upper portion of the tank, as shown at 19. Through the outlet 18 is adapted to flow a supply of the beverage proper, whereas through the outlet 19 is adapted to flow the foam and air which accumulates in the upper portion of the separator tank 13. To the outlets 18 and 19 is connected a Y section 20, which Y section has a passage 21 provided therein for communication with the outlet 19 and a passage 22 provided therein for communication with the outlet 18. The free end of the Y section 20 is connected by means of a suitable coupling nut 23 to my improved faucet which is generally designated by the reference character 24.

The faucet 24 is provided, as shown in Fig. 2 of the drawing, with a passage 25 which is in communication and alignment with the passage 21 and a second passage 26 which is in communication and alignment with the passage 22. As shown in the drawing, the passage 26 is suitably larger than the passage 25, said passages being separated from each other by the partition 27, which partition extends to a point just inwardly of the valve 28 which is provided adjacent the discharge end of the faucet.

A suitable tap screw 29 is threaded in a bearing 30 provided in the body of the faucet 24, said screw 29 having its lower end extending into the passage 25 and being adapted for obstructing the same. Thus by actuating the screw 29 in the desired direction, the passage 25 may be either completely closed or fully opened or partially closed, depending upon the position of the screw 29.

In operation, the separator tank is used to displace the usual coil provided for dispensing beverages of this kind, and said tank may be disposed in the cooling cabinet 31 which will cool the beverage, so that when the same is drawn through the faucet 24 it will be of the desired temperature.

From the above it will be apparent that I have provided a device which will be capable of not only separating the beverage proper from its foam, but also for regulating through means of the screw 29 the amount of foam that may be permitted to be discharged at the discharge end of the faucet. When the device is fully assembled, the actuation of the valve 28 will cause a supply of beverage proper to flow through the outlet 18 and passages 22 and 26 to the discharge end of the passage and simultaneously a supply of foam through the outlet 19 and passages 21 and 25 to mix with said beverage proper at the discharge end of the faucet. By providing the gauge 16, the operator may readily observe the pressure in the barrel and regulate the screw 29 accordingly so as to obtain at all times the desired amount of foam that will be discharged with the beverage proper. By being able to regulate the flow of the foam, it will be readily apparent that the necessity for wasting a considerable amount of the beverage, which must now be done with the devices now in use, will be eliminated.

It is believed that my invention, its mode of construction and assembly and operation, and many of its advantages should be readily understood from the foregoing without further description, and should also be manifest that while an improved embodiment of the invention has been shown and described for illustrative purposes, the structural details are, nevertheless, capable of wide variation within the purview of my invention as defined in the appended claims.

What I claim and desire to secure by Letters Patent of the United States is:

1. In a device for dispensing a beverage under pressure, the combination of a separator tank having an inclined baffle plate disposed therein for separating the beverage proper from the foam, and means for simultaneously drawing off said beverage and foam from said separator tank.

2. In a device for dispensing a beverage under pressure, the combination of a separator tank having an inclined baffle plate disposed therein for separating the beverage proper from the foam, and a faucet having connections with the top and bottom of said separator tank and arranged to draw off simultaneously said beverage and foam from said separator tank.

3. In a device for dispensing a beverage under pressure, the combination of a separator tank for separating the beverage proper from the foam, a pair of outlets provided in said separator tank, one of said outlets disposed adjacent the bottom of said tank and permitting the flow therethrough of the beverage proper and the other of said outlets disposed adjacent the upper portion of tank and permitting the flow therethrough of the foam, and a faucet having separate passages connected with each of said outlets, said faucet having a single discharge passage which is in constant communication with said first mentioned two passages.

4. In a device for dispensing a beverage under pressure, the combination of a separator tank having a baffle plate disposed intermediate the top and bottom thereof for separating the beverage proper from the foam, and a faucet having two passages provided therein, one of said passages being in communication with the lower portion of the separator tank and the other of said passages being in communication with the upper portion of said separator tank, and a single discharge passage for said faucet with which both of said first mentioned passages are in constant communication.

5. In a device for dispensing a beverage under pressure, the combination of a separating tank for separating the beverage proper from the foam, and a faucet having two passages provided therein, one of said passages being in communication with the lower portion of the separator tank and the other of said passages being in communication with the upper portion of said separator tank, said last mentioned passage being of less cross sectional area than said first mentioned passage, and both of said passages being in constant communication with the discharge end of the faucet.

6. In a device for dispensing a beverage under pressure, the combination of a separator tank for separating the beverage proper from the foam, and a faucet having two passages provided therein, one of said passages being adapted for permitting the flow therethrough of the beverage proper and the other of said passages being adapted for permitting the flow therethrough of the foam, and means provided in said last mentioned passage for regulating the flow therethrough, both of said passages being in constant communication with the discharge end of the faucet.

7. In a device for dispensing a beverage under pressure, the combination of a separator tank for separating the beverage proper from the foam, a pair of outlets provided in said separator tank, one of said outlets being disposed so as to permit the discharge therethrough of the beverage proper, the other of said outlets being disposed so as to permit the discharge therethrough of the foam, and a faucet having a pair of passages provided therein, one of which is in communication with the first mentioned outlet and the other of which is in communication with the other outlet from the separator tank, both of said passages in said faucet discharging into and being in constant communication with a single passage disposed adjacent the discharge end of said faucet, and means provided in the foam passage for regulating the flow of the foam therethrough.

8. In apparatus for drawing off liquid subject to gaseous pressure, the combination of a separator tank having a constantly open liquid inlet, a baffle disposed within said separator tank and adapted for separating the gas from the liquid proper, a liquid outlet provided adjacent the lower portion of the tank, a gas exit provided adjacent the upper portion of the tank, a single faucet having a pair of passages provided therein, each of the passages being connected with one of said outlets, both of said faucet passages being in constant communication with the discharge end of the faucet, and means provided in the gas exit passage of the faucet for regulating the flow of the gas therethrough.

In testimony whereof, I affix my signature.

ARTHUR GORDON.